United States Patent [19]

Barnea

[11] Patent Number: 4,913,536
[45] Date of Patent: Apr. 3, 1990

[54] VARIABLE POWER LENS AND METHOD

[76] Inventor: Daniel Barnea, 1 Ugarit Street, Tel-Aviv, Israel, 69016

[21] Appl. No.: 208,660

[22] Filed: Jun. 20, 1988

[51] Int. Cl.$^4$ ............................ G02B 3/14; G02C 7/08
[52] U.S. Cl. .................................... 350/419; 350/607; 351/41; 351/158; 351/159
[58] Field of Search ................. 351/41, 158, 159, 168; 350/418, 419, 607, 608

[56] References Cited

U.S. PATENT DOCUMENTS

| | | | |
|---|---|---|---|
| 2,576,581 | 11/1951 | Edwards | 350/419 X |
| 2,836,101 | 5/1958 | DeSwart | 350/419 |
| 3,161,718 | 12/1964 | DeLuca | 350/419 |
| 3,493,290 | 2/1970 | Traub | 350/419 X |
| 3,598,479 | 8/1971 | Wright | 350/419 X |
| 4,261,655 | 4/1981 | Honigsbaum | 351/41 |
| 4,418,990 | 12/1983 | Gerber | 351/41 |

FOREIGN PATENT DOCUMENTS 258325  9/1926  United Kingdom ................. 350/419

OTHER PUBLICATIONS

Raymond J. Roark and Warren C. Young, "Formulas for Stress and Strain", 5th Edition, McGraw-Hill Chapter 10, Article 10.2, pp. 324–363.

Primary Examiner—Scott J. Sugarman
Attorney, Agent, or Firm—Sandler & Greenblum

[57] ABSTRACT

A variable power lens includes a pair of optical membranes, each of which has a periphery and at least one of which is flexible. A frame is provided for holding the membranes with their peripheries in juxtaposition such that the surface of the membranes and their peripheries define a predetermined volume which is filled with refractive fluid. A control operatively associated with the frame selectively imposes forces on the periphery of the membranes which vary the fluid pressure in the volume. The membrane and the frame are constructed and arranged so that the surfaces of the membranes vary in a substantially spherical manner in response to changes in pressure of the fluid.

25 Claims, 4 Drawing Sheets

VARIABLE POWER LENS AND METHOD

TECHNICAL FIELD

This invention relates to variable power optical lenses, and to means for changing the focal lengths of the lenses.

BACKGROUND ART

Variable focal length optical lenses are of great value, particularly in the area of eyeglasses or spectacles. The human eye, after a person reaches the mid-forties, loses its natural flexibility for focusing on both near and far objects. As a consequence, most people require spectacles to assist them for both reading and long-distance vision. Several products are available for this purpose: reading spectacles, bifocal spectacles, and multifocal spectacles; but each has its drawbacks. Reading spectacles must be put on before beginning to read, assuming they can be found when needed. Bifocals allow close distance viewing, but only at restricted low angles which generally require the wearer to tilt his head to an unnatural position. Multifocal spectacles allow correction for a continuum of distances, but an even sharper angular restriction is involved and constant tilting of the head is required to focus on an object at a given distance. Moreover, some people experience difficulties in adjusting to bifocals and multifocal spectacles.

Spectacles with variable power lenses in which the focal length can be changed in response to the touch of a switch, or movement of a lever on or near the frame of the glasses are obviously of potential advantage to a user. U.S. Pat. Nos. 4,261,655 and 4,418,990 disclose fluid-filled flexible lenses which can be adjusted to provide variable power. The flexibility of the materials and the fluid in these lenses permit controlled variation in their focal lengths. One limitation in this approach, however, is that the optical quality of the lens is not preserved during focal variations. Failure to maintain the optical quality of a lens results in distortion that is usually unacceptable to a wearer. The problem arises because the shape variation of the surfaces of the lenses do not remain substantially spherical during focal variations. Ideally, the outer surface of a lens should be spherical before a focal change takes place, it should remain spherical after such change.

An object of the present invention, therefore, is to provide a new and improved variable power lens that solves the problems described above and achieves other advantages for spectacles as well as for magnifying glasses, or lenses or mirrors within various optical instruments (e.g., variable focus ocular lenses in a microscope).

DISCLOSURE OF INVENTION

A variable power lens according to the present invention comprises a pair of optical membranes each having a periphery, and at least one of which is flexible. Frame means are provided for holding the membranes with their peripheries in juxtaposition such that the surfaces of the membranes and their peripheries define a predetermined volume. A refractive fluid fills the volume; and control means, operatively associated with the frame, are provided for selectively imposing forces on the periphery of the membranes which vary the fluid pressure. The membranes and the frame are constructed and arranged so that the surfaces of the membrane are displaced in a substantial spherical manner in response to changes in pressure in the fluid.

Numerous applications exist for the variable power lens according to the present invention. One example is variable focus eyeglasses with round or non-round lenses. As is well known, elderly people need different glasses for different viewing distances. Because the flexibility of the eye lens is gradually lost with age, it is common for people to use glasses for reading, and to remove these glasses when the distance to a viewed object increases. Recent methods to alleviate the inconvenience of putting on and then removing glasses have included "bifocals", and more recently, "multifocals" spectacles. The user of such spectacles must restrict his viewing direction by looking up or down in order to attain the desired focal length. Often, this imposes severe difficulties on the user in terms of neck strain and inqconvenience. The present invention permits a single pair of glasses to be designed for reading, or short distance viewing, and for longer or far-sighted distances. A structure similar to normally shaped glasses may be built to carry two variable lenses to which a small conduit is connected. The conduit, which may be concealed within a decorative part of the spectacles, is effective to transfer fluid to and from a small source of fluid under the influence of a controlling mechanism. The source may include small containers kept on each side of the frame for the spectacles carrying the lenses, or elsewhere in a pocket. The control mechanism, which can be a piston-cylinder, or other type of pressurizing arrangement, may be activated by a lever utilizing manual or motorized energy. Multiple positions of the lever, which produce different fluid pressures between the membranes of the lenses may be provided corresponding to different focal distances of the lenses. This example can be further improved by the introduction of automation.

BRIEF DESCRIPTION OF DRAWINGS

Embodiments of the present invention are shown in the accompanying drawings wherein.

DETAILED DESCRIPTION

Figure 1A:
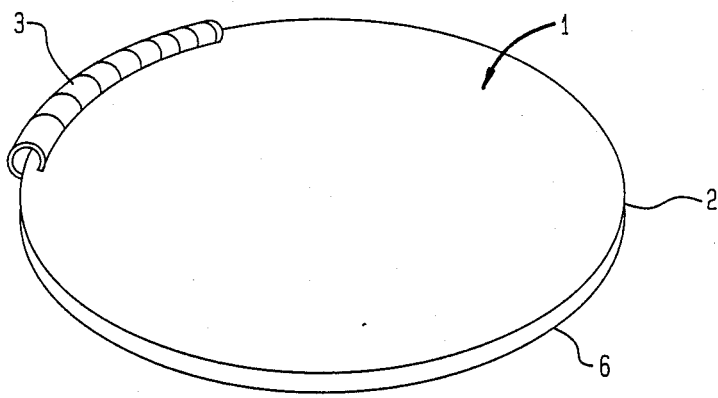
FIG. 1a is a perspective view of a lens showing a portion of a membrane according to the present invention.

Before discussing details of the present invention, a comment on the theory behind the operation of the present invention may prove valuable. Considering two flexible, transparent, circular (disc-shaped) membranes which are superposed and connected along their peripheries. The connection is such that the space between the membranes, along the peripheries thereof, is as small as possible. A hollow space between the central surfaces of the membranes is thus created. By incorporating a sealing means between the peripheries of the membranes, an enclosed volume is defined which is filled with a refractive fluid. A conduit that penetrates the sealing means allows fluid to be exchanged between a source and the enclosed volume for changing the fluid pressure therein.

When the volume is filled with transparent fluid which has a refractive index similar to the refractive indices of the membrane, as described in U.S. Pat. No. 4,261,655, the structure defined by the membranes and the fluid trapped therebetween constitute and optical lens the properties of which depend on the index of refraction and on the shapes of the outer surfaces of the membranes. The exact shape of the surfaces in contact with the fluid are not significant when the indices of refraction of the membranes the fluid are substantially the same.

If the index of refraction of the fluid is different from that of the membranes, then a lens is defined by the volume of fluid which acts in conjunction with the lenticular properties of the adjacent membranes. These arrangements establish a "variable lens".

The volume and pressure of the fluid enclosed in a variable lens may be variable by providing a source of fluid connected by a conduit to the fluid between the membranes. A special case exists where no transfer of fluid into or out of the lens is necessary in order to change its focal length. In such case, variation in the pressure of the fluid trapped between the membrane will effect variations in the curvature of the membranes themselves without any change in the volume of fluid. In general, for a given design, the changes in pressure and volume, are uniquely related to the surface shape of the membranes and therefore also to the resulting optical properties of the lens. If the surface displacments of the membranes remain substantially spherical for any applied pressure, then the device will indeed be a quality lens which can be the basis for various applications. In addition, the exact curvature of the membranes and fluid surface, and the exact refraction indices of the membranes and the fluid, are degrees of freedom in a design for optimized aberration or color correction.

The above description is appropriate even if only one of the membranes is flexible. It is also important to observe that any outer surface of the lens need not be spherical, a-priori. That is to say, a surface of a lens may have a permanent optical correction of some sort, but curvature variations during the change of focal length should be spherical in nature for the lens to operate properly. More precisely, if $F1(x,y)$ defines the surface function of the variable lens at any point $(x,y)$ under pressure $P1$, and $F2(x,y)$ defines the surface under another pressure $P2$, then proper operation of the lens requires that the function $V$ of displacements of the surface, namely:

$$V12(x,y) = F1(x,y) - F2(x,y) \quad (1)$$

defines a spherical surface, or at least a good approximation of such a surface for any pair of pressures $P1$ and $P2$.

By Hook's law, one can assume that the function $Vij(x,y)$ is linearly proportional with respect to the value of the pressure differences for any small enough variation $Pi - Pj$ that may be involved. That is to say:

$$Vij(x,y) = Beta(x,y) * (Pi - Pj) \quad (2)$$

for any $(x,y)$ where Beta is a location-dependent proportionality coefficient.

One way to ensure a good approximation of the condition set forth in equation (1) is by utilizing a circular membrane with almost uniform thickness and uniform flexibility. The application of certain forces along the periphery of the membrane will fix the periphery of the membrane in space. Such forces should be perpendicular to the surface, and should not apply torques along the periphery. If pressure is applied on one side of the membranes by a fluid, this pressure will be uniform according to Pascal's law. It can be shown, for example in Formulas for Stress and Strain, 5th Edition by Raymond J. Roark and Warren C. Young, McGraw Hill Book Company, that the resulting surface changes will be substantially spherical as required by equation (1).

Additional correction of the curvature of the surface can be introduced by varying the thickness of the membrane. That is to say, by making the thickness of the membrane spatially dependent, a compensation for the curvature of the surface can be made. For example, a deviation from a spherical surface, which still has radial symmetry, is achieved by a membrane whose thickness is a function of the radius of the membrane. A determination of the thickness function can be computed in a conventional way by the use of "finite elements", or "finite differences" method for the solution of the partial differential equations that determine the surface shape under pressure variations within the boundary conditions which depend on the various type of frames in which the membranes are mounted. Details are found in the Roark et al. text referred to above.

The lens described above is circular; but, the defining membranes need not be circular in order to establish a variable power lens. The important issue it the ability to extend the design methods so that under applied fluid pressure, incremental changes of curvature will continue to follow a spherical law as described above in connection with the circular case.

A non-circular membrane can always be viewed as part of a larger circular membrane and obtained by cutting away parts of this larger membrane. The periphery of the "new" membrane would then be composed of two types of sections: peripheral sections that belong to the original and larger circular membrane, and sections defined by the newer cutting line. One way to construct a non-circular lens is to mount the newly cut membranes along their periphery so that the boundary parts of the lens "sense" the same conditions that existed, at corresponding locations, within the "original" circular lens. In other words, boundary conditions can be established by the frame which affect the non-circular lens in the same way that the corresponding portion of a circular lens would be affected.

At any point of a section of the original periphery, the mounting is merely by a force that is perpendicular to the surface of the membrane as in the case of the original lens. However, at any peripheral point along the newly cut line, the mounting must provide a perpendicular force, and also a torque exerted on the edge of the membrane. The torques and forces, at any location and pressure, have to be designed to resemble their counterparts for the original circular membrane. This can be achieved by segmenting the design of the frame holding the peripheries of the membranes so that different forces are applied around the peripheries. Alternatively, the spacing between the peripheries can be spatially dependent.

A variable non-circular lens may also be achieved without the use of torques as boundary conditions along its circumference. If, for the sake of simplicity, only perpendicular forces are used as boundary conditions, then the compensation for the lack of torques on the periphery, may be accomplished via modification in the thickness function of the membrane as described above. In either case, the spherical condition can be maintained. However, if conditions of the deviation away from the spherical nature are desirable, then modifications of the thickness of the membrane as a function of its location may also be needed.

Figure 1B:
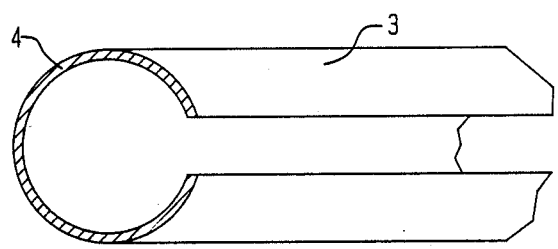
FIG. 1b is a section of a frame for holding membranes according to the present invention.
Figure 1C:
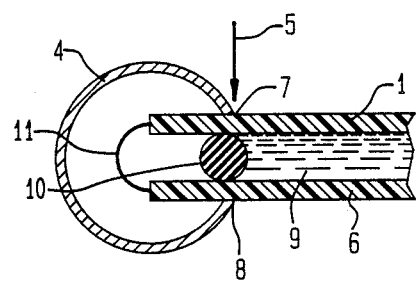
FIG. 1c is a cross-section of a frame and two membranes mounted therein.

Referring now to FIG. 1 of the drawings, a lens according to the present invention includes a pair of juxtaposed circular optical membranes 1 and 6 each having peripheral edges 2. The peripheral edges of the membrane are gripped, or harnessed, by frame 3 which may be unitary or a plurality of individual segments. As shown in FIG. 1a, the frame may have a C-shaped cross-section that mechanically grips the peripheral edges of the membranes. The frame engages membranes 1 and 6 at points 7 and 8, and exerts a force on the membranes in the direction of arrow 5 at the points of engagement of the frame with the membranes. The frame may also exert a torque indicated by reference numeral 7 if a bond exists between the frame and material. The frame is elastic and a change in spacing between engagement points 7 and 8 in the direction of arrow 5 creates the abovementioned forces and torques. Frame 3 thus clamps the peripheral edges of one member to the peripheral edge of the other member so that an enclosed space 9 is created between the surfaces of the membranes. Enclosed space or volume 9 is filled with a refractive fluid. One way of sealing volume 9 against leakage of the fluid is to interpose annular flexible gasket 10 between the peripheries of the membranes. Preferably, the gasket is circular in cross-section and is similar to an O-ring. Such a sealing arrangement is particularly convenient when the membranes are circular. When, however, the membranes are not circular, other sealing techniques are possible. For example, a flexible, annular impermeable layer 11 may be bonded to the peripheral edges of both membranes. In such case, gasket 10 may be dispensed with.

The harnessing force imposed by the frame on the peripheral edges of the membranes, measured in grams per cm., is perpendicular to the surface of the membrane where contact is made with the frame. This force is created in response to the pressure of the fluid in the enclosed space between the membranes. At any circumferential point, the magnitude of the harnessing force is proportional to the distance of this point from its rest point, which is defined as the point occupied under conditions of zero fluid pressure. Torque, measured in newton-cm. per cm., with a direction tangential to the circumferential contour of the membrane, opposes rotation of the membrane around the edge caused by the pressure, and is proportional to the angle of rotation of the point relative to its rest point. The rest point, as indicated above, it the point occupied in the absence of fluid pressure between the membranes.

Figure 2:
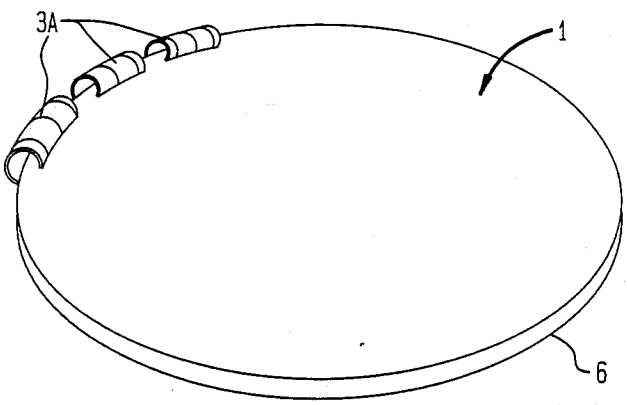
FIG. 2 is a perspective view of a frame comprising several independent segments for mounting the membranes of the lens.

FIG. 2 shows membranes 1 and 6 clamped between separate segments 3A of a frame. These segments represent a plurality of fastening elements that replace continuous frame 3. The use of separate segments permits establishing a non-uniform distribution of harnessing forces around the peripheral edges of the membranes. The latter is particularly useful when non-circular membranes are involved. In such case, the segments are designed to impose predetermined forces on the edges of the membrane such that the forces produced by the segments in response to changes in pressure of the fluid between the membranes is accompanied by spherical changes in the surface of the membranes.

Figure 3A:
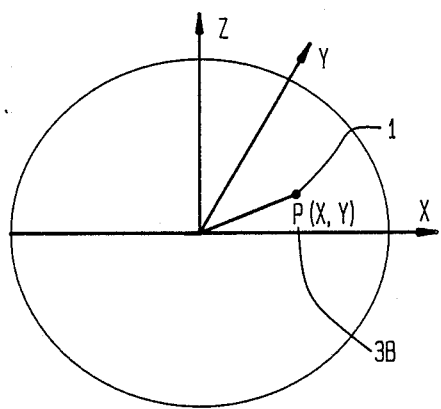
FIG. 3a shows coordinates describing the points on the surface of a membrane.
Figure 3B:
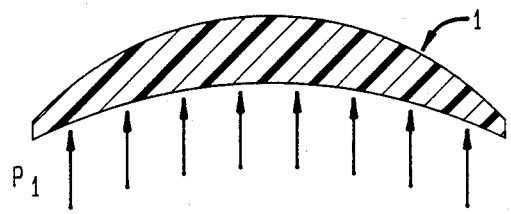
FIG. 3b is a cross-section of a membrane showing the direction of fluid pressure applied to the membrane.

FIG. 3 indicates schematically how the surface of membrane 1 is described when it lies roughly in the x—y plane in rest position. The location of any point 3B on the surface of the membrane when the fluid is pressurized and the membrane is displaced, is defined in terms of its x,y,z coordinates. The pressurization of the fluid results in a uniform fluid pressure on the inner surface of the membrane as shown in FIG. 3b, such fluid pressure being perpendicular to the surface of the membrane. For small displacements of the membrane from the x—y plane, the fluid pressure will be directed approximately in the z direction. If Fi(x,y) indicates the z position of the surface at location x,y when pressure Pi is applied, then the difference function, namely Fi−Fj, defines the incremental curvature of the outer surface of the membrane due to a change from pressure Pi to Pj. The conceptual surface defined by the deviation Fi−Fj, for any pair of Pi and Pj, will be a spherical surface if the thicknesses of the membranes are properly designed. The design of the thickness of a membrane, as a function of x,y, can be carried out by computer using the finite elements methods for the solution of partial differential equations as described in the Roark et al. reference.

Figure 4:
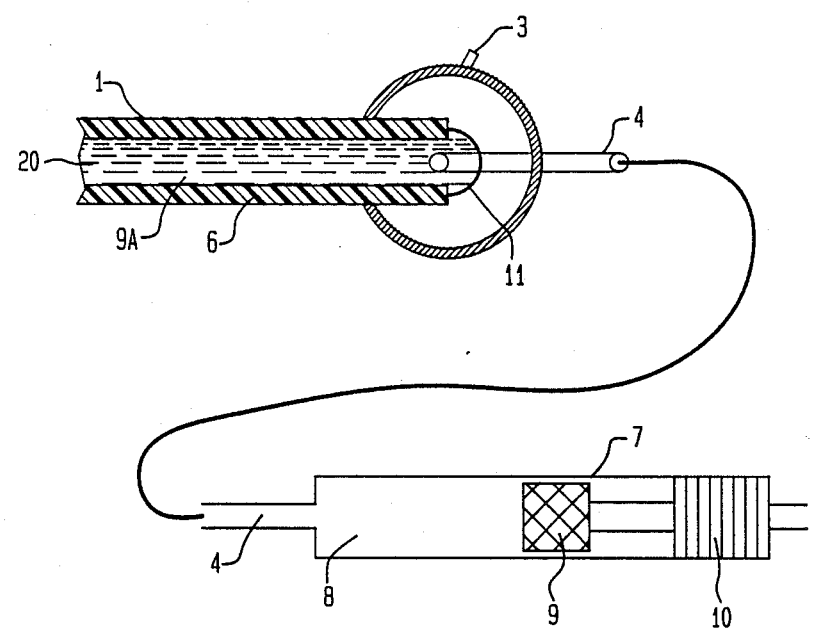
FIG. 4 shows a conduit and components of a mechanism for pressurizing the fluid.

FIG. 4 shows a variable power lens comprising juxtaposed optical membranes 1 and 6, at least one of which if flexible, and which are sealed at the peripheral edges by impervious layer 11 to define enclosed volume 9A filled with refractive fluid 20. The peripheral edges of the membrane are clamped together by frame 3; and fluid 20 is pressurized by control means in the form of cylinder 7 containing piston 9 that forces fluid 8 through conduit 4 into volume 9A when the piston is moved by motor 10 which is selectively actuatable. The axial position of piston 9 in cylinder 7 will determine the pressure in enclosed volume 9A thereby providing the user with a way in which to select a predetermined power for the lens.

Figure 5A:
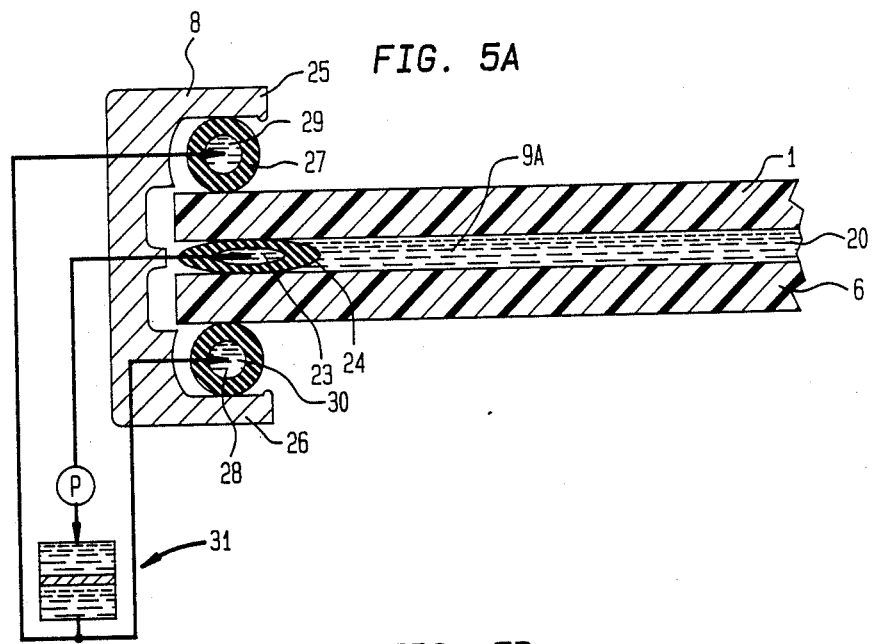
FIGS. 5a and 5b indicate a frame for mounting a lens according to the present invention wherein the volume of fluid between the membranes remains fixed, but providing for changes in fluid pressure.

FIG. 5a shows a variable power lens comprising juxtaposed optical membranes 1 and 6, at least one of which is flexible, and which are sealed at their peripheral edges by a gasket in the form of annular ring 24 which contains a central bore 23. This arrangement defines enclosed volume 9A between the membranes, this volume being filled with refractive fluid 20. The peripheral edges of the membranes are clamped together by frame 8 which is U-shaped having a pair of spaced legs 25, 26. The lateral space between the legs is sufficient to receive the peripheries of the membranes, and auxiliary gaskets 27, 28 interposed between the respective legs of the frame and the membranes. Auxiliary gasket 27 is annular in shape and contains central bore 29. Similarly, gasket 28 is annular in shape and contains central bore 30. The bores in each of gaskets 24, 27 and 28 are filled with auxiliary fluid. Each of these bores is also connected to control means 31 which is designed so that fluid in gasket 24 can be exchanged with fluid in gaskets 27 and 28. That is to say, the operation of pump P in control means 31 will extract fluid from gasket 24 and add a corresponding amount of fluid to gaskets 27 and 28. By proper design of the sizes of the bores in the various conduits, pump P can be used for the purpose of varying the space between the peripheral edges of membranes 1 and 6. This change in spacing is independent of the volume of fluid in enclosed volume 9A between the membranes.

In order to decrease the spacing between the peripheral edges of the membranes, pump P is operated to withdraw auxiliary fluid from the bore in membrane 24 and to supply the withdrawn fluid to the bores of gaskets 27 and 28. When the reverse is desired, fluid is withdrawn from gaskets 27 and 28 and added to the fluid in gasket 24.

The smaller the spacing between the peripheral edges of the membranes, the larger is the pressure inside the enclosed volume. As a consequence, the surface curvature of the resilient membrane adjusts accordingly and is increased. When the spacing between the peripheral edges of the membranes is reduced, the pressure is reduced in the enclosed volume and the surface curvature of the resilient membrane is reduced. Thus, the focal length of the lens decreases when the spacing between the membranes is reduced, and the focal length increases when the spacing between the membranes is increased. The focal length can be changed beyond infinity so as to become negative.

In the arrangement shown in FIG. 5a, pressurizing of the fluid in the enclosed space is achieved by operation of control means 31, i.e., by changing the spacing between the peripheral edges of the membranes. As a consequence, the viscosity of the refractive fluid trapped in enclosed space 9A is not important because no pumping of this fluid is involved. Thus, a large number of conventional refractive fluids can be used in the lenses.

Another advantage of the arrangement shown in FIG. 5a is that the volume and viscosity of fluid required to be transferred in order to effect changes in the focal length are significantly smaller than would be the case were the refractive fluid pressurized in the conventional manner by a pump. Thus, the time required to effect a change in focus is shorter with the arrangement shown in FIG. 5a than in the conventional arrangement described previously. In addition, because the volume of auxiliary fluid is so small, a lower energy requirement is involved with the present invention.

Another advantage in the present invention is that the maximum thickness of the variable power lens according to the present invention is minimized over the whole range of focal length changes. The lens can be designed to have a small distance between the membranes, either near the periphery or near the center, at the extreme focal settings. As a consequence, the variable power lens of the present invention has a minimum-weight design.

Because the auxiliary fluid used with control means 31 is separate from the refractive fluid, a low viscosity auxiliary fluid can be used to facilitate operation. Furthermore, the total volume of fluid required to be transferred to effect a given change in focal length is very small compared with the volume changes that are required for pumping the refractive fluid. This permits a compact and light-weight design.

Figure 5B:
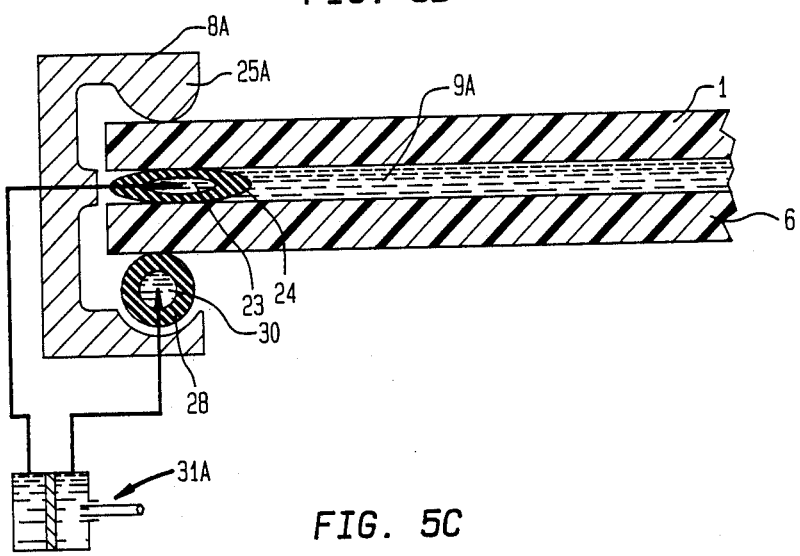
Figure 5C:
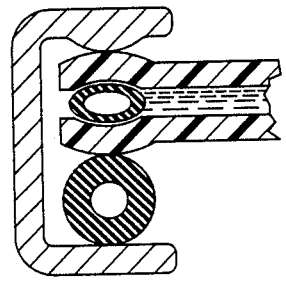

The embodiment shown in FIG. 5b is similar to the embodiment shown in FIG. 5a except that the frame shown in FIG. 5b has bulbous leg 25a which provides a fixed support that directly engages a peripheral edge of membrane 1. The peripheral edge of the other membrane is gripped by annular gasket 28. In the embodiment shown in FIG. 5b, the internal gasket 24 is the same as in the previous embodiment. By way of example, membranes 1 and 6 may have either an annular depression or an edge lip along their peripheral edges creating a space into which annular gasket 24 fits as shown in FIG. 5c. Such a design allows minimization of the overall thickness.

However, control means 31a is effective to control the exchange of fluid between the central bores in each of these two gaskets thereby controlling the spacing between the peripheral edges of the membranes.

Figure 6:
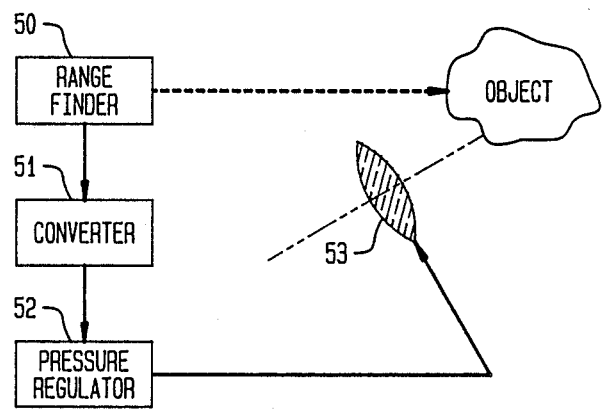
FIG. 6 is a block diagram of an automated system for controlling the power of a lens as a function of the distance of an object from the lens.

Referring now to FIG. 6, an automated embodiment of the invention is disclosed. In this embodiment, rangefinder 50, which operates either optically or ultrasonically, provides a signal indicative of the distance of an object from the viewer. Converter 51, responsive to the signals produced by range finder 50, converts these signals into a pressure control signal applied to pressure regulator 52. Responsive to the pressure control signals, regulator 52 controls the fluid pressure in lens 53 which is constructed in accordance with the previous embodiments. That is to say, pressure regulator 52 may be designed as shown in FIGS. 5a or 5b for the purpose of changing the spacing between the peripheral edges of the membranes in order to control the internal pressure in the enclosed volume between the membranes.

The advantages and improved results achieved by the method and apparatus of the present invention are apparent from the foregoing description of the preferred embodiment of the invention. Various changes and modifications may be made without departing from the spirit and scope of the invention as described in the claims that follow.

In a special case, a lens according to the present invention can be converted into a mirror having a variable focus by arranging for the flexible membrane to have a coating on either the inside surface or the outside surface. Alternatively, a flexible metallic membrane may be used; and in such case, a coating is not needed because the metal acts as a reflector.

I claim:
1. A variable power lens comprising:
 (a) a pair of optical membranes at least one of which is flexible;
 (b) a frame for clamping the periphery of one membrane to the periphery of the other so that an enclosed volume is created between the surfaces of the membranes;
 (c) a refractive fluid filling said volume;
 (d) means associated with said frame for applying forces and/or torques to the periphery of the membranes at selected locations therealong such that the pressure of the fluid in said enclosed volume is responsive to such forces and/or torques for displacing the surface of the flexible membrane in a substantially spherical manner.

2. A lens according to claim 1 wherein the pressure of said fluid, and thus the curvature of the membranes, is carried out without changing the volume of the refractive fluid by changing the spacing between the membranes along their periphery.

3. A lens according to claim 2 including a flexible hollow spacer along the periphery of the membranes for forming a seal for the refractive fluid in said volume, a secondary and independent fluid filling the hollow in said spacer, and means for selectively changing the pressure and volume of said secondary fluid for changing the optical of the lens.

4. A lens according to claim 1 wherein one of the membranes has a thickness that varies such that during changes in pressure of the refractive fluid, the displacement of said one of the membranes defines a spherical surface so that the focal lens changes without distortions.

5. A lens according to claim 1 in which the frame includes segments individually and independently operable for changing the pressure of said fluid.

6. A lens according to claim 5 wherein one of said membranes is rigid.

7. A lens according to claim 2 wherein an average "resting" pressure inside the lens defines a resting state wherein control pressure variations are positive or negative with respect to that state during variations in said pressure whereby aging of the flexible member by reason of repetitious deformations from its original shape are minimized.

8. A lens according to claim 3 including a conduit passing through said spacers and into said enclosed space without breaking the seal for allowing the transfer of refractive fluid into and out of the enclosed space.

9. A lens according to claim 8 including a source of refractive fluid, and means for connecting said source to said enclosed space via said conduit for pressurizing fluid in said volume.

10. A lens according to claim 1 wherein the fluid is a gas.

11. A lens according to claim 1 wherein the material of said membranes is sufficiently transparent and has suitable refractive properties, for light of the type including visible light, infrared light, and combinations thereof.

12. A lens according to claim 1 including a servosystem, an automatic range finder, and a converter for converting signals from the range finder into pressure values which automatically regulate the focal length of the lens.

13. A lens according to claim 1 wherein said frame is constructed and arranged to produce forces on the periphery of each membrane which are uniform and perpendicular to the membrane.

14. A variable power lens comprising:
(a) a pair of optical membranes each of which has a periphery, and at least one of which if flexible, the peripheries being juxtaposed;
(b) frame means for holding said membranes with their peripheries in juxtaposition such that the surface of the membranes and their peripheries define a predetermined volume;
(c) a refractive fluid filing said volume; and
(d) control means operatively associated with said frame means for selectively imposing forces on the periphery of the membranes which vary the fluid pressure is said volume;
(e) said membranes and said frame means being constructed and arranged so that the surface of the flexible membrane varies in a substantially spherical manner in responsive to changes in pressure in the fluid.

15. A variable power lens according to claim 14 wherein said volume remains fixed when the pressure varies.

16. A variable power lens according to claim 15 wherein the spacing between the periphery of said membranes is variable.

17. A variable power lens according to claim 14 including a hollow gasket interposed between the periphery of the membranes, and control fluid filling said gasket for controlling the amount of fluid in said gasket thereby determining the peripheral spacing between the membranes.

18. A variable power lens according to claim 17 wherein said frame means includes an auxiliary hollow gasket interposed between the periphery of one of the lenses and the frame means, said control fluid filling said auxiliary hollow gasket, and fluid control means for controlling the percentage of fluid in each hollow gasket.

19. A variable power lens according to claim 18 wherein said frame means is U-shaped with a pair of spaced legs for receiving the peripheries of said membranes, said auxiliary gasket being interposed between one of the legs and one of the membranes.

20. A variable power lens according to claim 19 including a second auxiliary hollow gasket interposed between the other of the legs, and the other of the membranes, said control fluid filling said second auxiliary gasket, and fluid control means for proportioning said control fluid between the auxiliary gaskets and said hollow gasket.

21. A method for varying the power of a lens of the type having juxtaposed optical membranes, at least one of which is flexible, and which are sealed at their peripheries to define an enclosed volume containing a refractive fluid, said method comprising the steps of: pressurizing the refractive fluid, and clamping the peripheral edges of the membranes such that the pressure of the fluid is responsive to forces and/or torques applied to the peripheral edges of the membrane, and incremental changes of curvature of a region of the surface of the flexible membrane, in response to changes in pressure of the fluid, follows a spherical law.

22. A variable power lens comprising:
(a) a pair of optical membranes, each of which has a peripheral edge and a central surface, and at least one of which is flexible;
(b) sealing means for sealing the peripheral edges of the membranes and defining an enclosed volume between the surfaces of the membranes;
(c) a refractive fluid filling said volume;
(d) frame means for gripping the peripheral edges of the membranes and imposing forces and torques on said edges; and
(e) means associated with the frame for controlling the forces and torques on the peripheral edges of the membranes, the pressure of the fluid in said volume being responsive to said forces and torques.

23. A variable power lens according to claim 22 wherein said means for selectively pressurizing the fluid in said volume includes means for changing the spacing between the peripheral edges of the membranes.

24. A variable power lens according to claim 22 wherein said frame means is constructed and arranged so that the distribution of forces imposed on the edges by the frame member is non-uniform around the periphery of the membranes.

25. A variable power lens according to claim 1 wherein said at least one of the membranes has a reflective coating to form a mirror with a variable focus.

* * * * *